(No Model.)
L. BENTLEY.
TRACE FASTENING.
No. 427,957. Patented May 13, 1890.
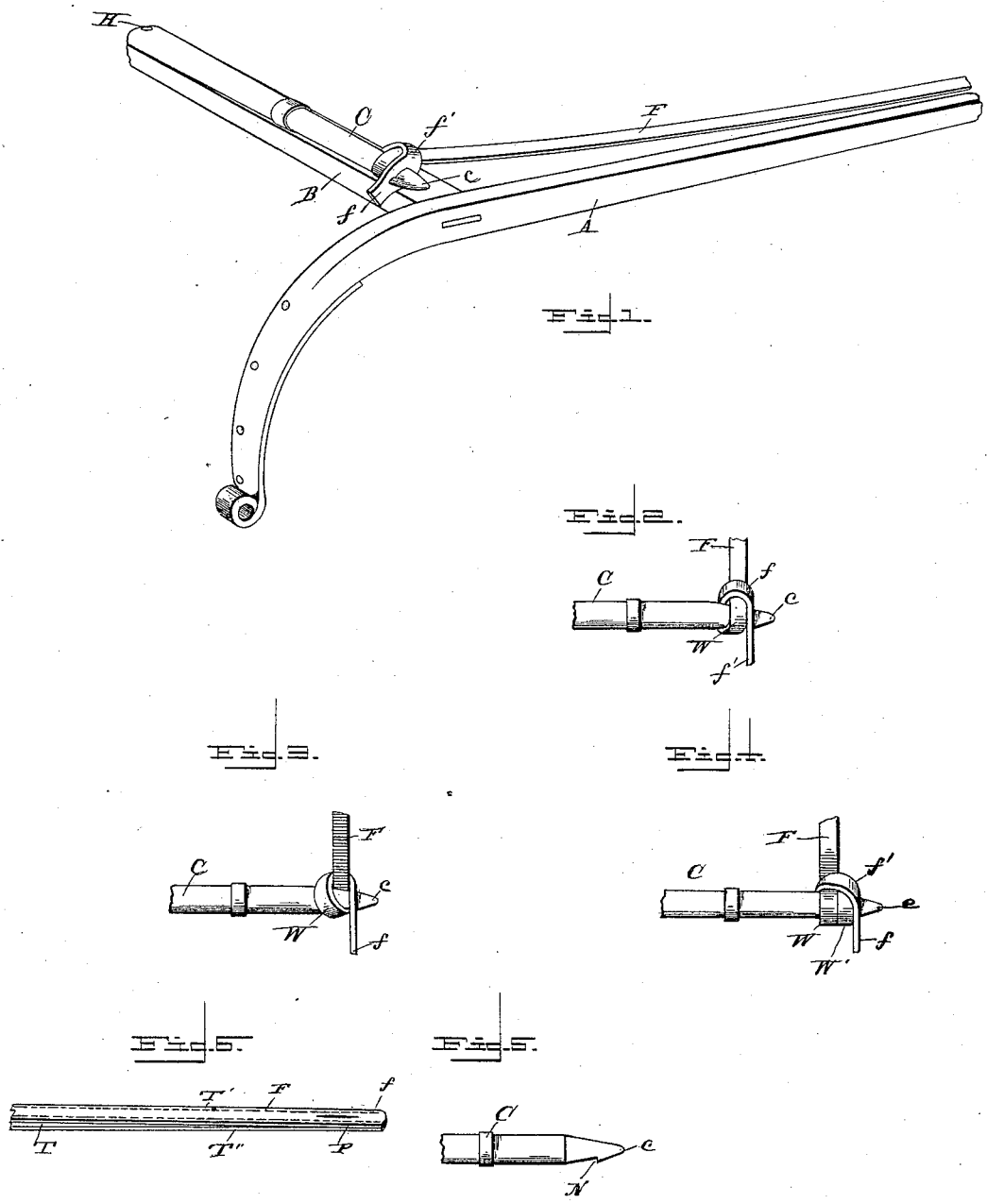
WITNESSES
INVENTOR

UNITED STATES PATENT OFFICE.

LINN BENTLEY, OF REMPEL, OHIO.

TRACE-FASTENING.

SPECIFICATION forming part of Letters Patent No. 427,957, dated May 13, 1890.

Application filed February 5, 1890. Serial No. 339,363. (No model.)

*To all whom it may concern:*

Be it known that I, LINN BENTLEY, a citizen of the United States, residing at Rempel (P. O.,) in the county of Jackson and State of Ohio, have invented certain new and useful Improvements in Trace-Fastenings; and I do hereby declare the following to be a full, clear, and exact description of the invention, such as will enable others skilled in the art to which it appertains to make and use the same.

The object of my invention is to provide an improved trace and an efficient fastening of the same to the whiffletree of a carriage or wagon.

In the drawings, Figure 1 is a perspective view of a portion of the shaft, cross-bar, and whiffletree with my trace attached. Figs. 2, 3, and 4 are details showing different forms of winding. Fig. 5 is a detail showing the end of the whiffletree. Fig. 6 is a detail showing the perforated end of trace.

Some of the difficulties met with in the ordinary form of trace-fastening for carriages and wagons are that, in order to make the perforated or slit end of the trace of sufficient strength, it has to be made of a thickness which renders it extremely stiff and difficult to handle. In order to use the diminished size of perforation necessary, an iron tip must be attached to the whiffletree, which is more or less costly in construction and weakening in effect.

In my invention security of attachment is obtained with facility of operation.

A, Fig. 1, is a portion of the shaft, and B the cross-bar, to which the whiffletree C is pivoted in the usual manner at its center H. Near each end of the whiffletree a slight notch N is cut, preferably near its tapered portion $c$, as shown in Fig. 5. The trace F is made light and flexible, and the end $f$ has the usual slit or perforation P in it, all as shown in Fig. 6. The end of the trace is wound around the whiffletree in one or more turns W W', as shown in Figs. 2, 3, and 4. The end $f$ of the trace is then passed outside of the main portion of the trace, which is wound around about the whiffletree and passed over the end $c$ and back of the notch N, so that the portion $f'$ lies upon the portions W W'. The trace may be passed over the upper side of the whiffletree, as shown in Fig. 2, or under, as shown in Fig. 3, the other points of arrangement being similar in each case.

The ordinary form of trace may be used in my invention, being simply made much lighter and more flexible than is usual; but the preferred form of trace is that shown in Fig. 6, which diminishes in thickness toward the end $f$. This may be done by permitting the middle portion T of the trace to run to nothing, so that the outer layers T' T'' come together at the end, or by permitting the outer layers T' T'' to run out to nothing and the central portion T to taper to the end.

The advantages of my invention are the combination of simplicity and readiness of attachment with security and the greatest possible strength with the least possible consumption of material. No iron attachments are necessary for the whiffletree, which simply has a notch cut in it to keep the trace from sliding off. At the same time the large perforation P does not render necessary a great thickness and consequent stiffness of the end of the trace, inasmuch as little or no strain is brought upon this portion of the trace when it is attached to the whiffletree in the manner provided for in my invention. Not only does no additional strength have to be given to the end, but it may be materially diminished in thickness and strength, as before set out. This will be evident when it is considered that the entire strain upon the portion F of the trace is not transmitted through the various turns W W', but only a diminishing portion thereof, so that by the time the end of the trace $f$ is reached there is little or no strain upon the leather, and the thickness of the same may therefore be materially reduced and the ease of manipulation greatly increased without in any way increasing the possibility of a rupture.

Having therefore described my invention, what I claim as new, and desire to protect by Letters Patent, is—

1. The combination of the whiffletree, which has a slight notch cut in it near each end, with a flexible trace which is wound one or more times around said whiffletree between the notch and the center of the whiffletree, and which has a perforated end which passes outside of the main portion of the trace and over the notched end, substantially as described.

2. The combination of the whiffletree, which has a slight notch cut in it near each end, with a flexible trace which diminishes in thickness toward its end and is wound one or more times around said whiffletree between the notch and the center of the whiffletree, and which has a perforated end which passes outside of the main portion of the trace and over the notched end, substantially as described.

In testimony whereof I affix my signature in presence of two witnesses.

LINN BENTLEY.

Witnesses:
 ROBERT DAVIS,
 CYRUS JENKINS.